United States Patent [19]

Peoples, Jr. et al.

[11] Patent Number: 4,508,771
[45] Date of Patent: Apr. 2, 1985

[54] EXTRUDED CARPET BACKING WITH RESIN AND ELASTOMER COMPONENTS

[75] Inventors: Clarence Peoples, Jr., Rockwell, N.C.; Robert C. Puydak, East Orange; Deborah S. Jansen, East Windsor, both of N.J.

[73] Assignees: Exxon Research & Engineering Co.; Collins and Aikman Corporation, both of Del.; a part interest to each

[21] Appl. No.: 95,565

[22] Filed: Nov. 19, 1979

[51] Int. Cl.³ .................. B32B 3/02; B32B 33/00
[52] U.S. Cl. ........................... 428/95; 428/96; 428/97; 156/72
[58] Field of Search ............... 428/95, 96, 97; 156/72

[56] References Cited

U.S. PATENT DOCUMENTS

| | | | |
|---|---|---|---|
| 3,525,662 | 8/1970 | Padgett | 428/97 |
| 3,676,280 | 7/1972 | Sands | 428/97 |
| 3,745,054 | 7/1973 | Smedberg | 428/97 |
| 3,770,558 | 11/1973 | Stahl | 428/96 |
| 3,911,185 | 10/1975 | Wright | 428/97 |
| 3,914,489 | 10/1975 | Smedberg | 428/97 |
| 3,982,051 | 9/1976 | Taft | 428/97 |
| 4,012,547 | 3/1977 | Smedberg | 428/97 |

Primary Examiner—Marion E. McCamish
Attorney, Agent, or Firm—Lerner, David, Littenberg, Krumholz & Mentlik

[57] ABSTRACT

Highly flexible compositions of matter useful in the preparation of carpet backing are disclosed comprising thermoplastic resin compositions including copolymers of ethylene and unsaturated esters of lower carboxylic acids, such as vinyl esters and/or lower alkyl acrylates, in admixture with olefinic elastomers and substantial amounts of filler. The preferred thermoplastic resins employed include the copolymers of ethylene and vinyl acetate, and the preferred olefinic elastomers disclosed are ethylene copolymer elastomers, such as copolymers of ethylene and propylene, as well as terpolymers of ethylene, propylene and a diene, and the compositions preferably include a stearate or stearic acid and a hydrocarbon oil component. Carpet constructions are also disclosed comprising a plurality of carpet fibers and a thermoplastic barrier coating comprising the above combination of a thermoplastic resin, an olefinic elastomer and a substantial portion of filler material. Preferably a thermoplastic adhesive pre-coat layer is employed to bind the fibers together, and this is employed with a tufted carpet to adhere the carpet tufts to a woven or non-woven carpet scrim. These carpet constructions are preferably utilized in automotive carpeting applications. Methods for preparing said carpet constructions are also disclosed, comprising preparing the above thermoplastic barrier coating, applying (preferably by extrusion) an adhesive precoat to the surface of the carpet fibers so as to bind the fibers securely together, and applying the barrier coating so as to provide a strong and highly flexible carpet construction.

63 Claims, No Drawings

EXTRUDED CARPET BACKING WITH RESIN AND ELASTOMER COMPONENTS

FIELD OF THE INVENTION

The present invention relates to carpet backing compositions. More particularly, the present invention relates to extruded carpet backing materials used to provide a durable, highly flexible carpet backing capable of being thermoformed. Still more particularly, the present invention relates to carpet constructions, preferably including a tuft, means, such as a scrim, for retaining the tuft, and an extruded thermoplastic barrier coating as the carpet backing therefor. Still more particularly, the present invention also relates to methods for preparing carpet constructions, including the step of applying a thermoplastic barrier coating to the precoated carpet.

BACKGROUND OF THE INVENTION

While carpets are generally manufactured by a number of methods, processes such as tufting and needle punching have become quite popular in the last few years. In particular, the majority of carpeting manufactured today is produced by the tufting process. Such tufted carpets have been manufactured for a number of years, and generally comprise composite structures in which tufts, or bundles of carpet fibers are introduced (such as by stitching) into a primary backing or scrim, such as a woven or non-woven fabric. A secondary backing or coating of thermoplastic material is then applied to the underside of the carpet construction in order to securely retain the tufted material in the primary backing. This secondary backing not only dimensionally stabilizes this construction but also provides greater abrasion and wear resistance, and serves as the adhesive for the barrier coating.

Many materials have been employed as the primary base or backing, and these preferably include woven materials such as jute, polypropylene film, etc. The primary backing can also comprise a non-woven fabric such as needle punched, non-woven polypropylene web, etc. For many years, the aqueous latex method has been employed for the secondary backing materials, but in recent years a hot melt adhesive composition has been utilized for such secondary carpet backing purposes. These have included thermoplastic resinous materials, such as powdered polyethylene.

Another commercially important carpet manufacturing process is needle punching. In this process the carpet fibers are punched by a series of barbed needles which causes them to mechanically interlock and form a non-woven loose fabric structure. In both of these above-described commercial processes the problem of fiber loss is always present. It has thus been necessary to employ a back coating in both cases, for this reason and also to provide such dimensional stability and body thereto. The problem of such fiber loss is particularly acute in connection with automotive carpeting where wear is generally concentrated into limited areas and the carpet is subjected to sliding and other forces which have resulted in excessive fiber loss therein.

As an improvement over the previously used powdered polyethylene coating as the secondary carpet backing, and in an attempt to provide a sound and thermal barrier in connection with automotive carpeting, attempts have been made to apply various thermoplastic resin layers to the carpeting. U.S. Pat. No. 3,525,662, for example, teaches the use of a coating of thermoplastic material comprising a mixture of polyolefin and low viscosity saturated hydrocarbon such as petroleum wax. The patentee claims that this inclusion of low viscosity material increases the speed of processing as well as the wear characteristics of his final carpet product, which is said to be particularly intended for use in automotive carpeting.

Subsequently, Collins and Aikman Corporation developed a calcium carbonate-loaded ethylene/vinyl acetate copolymer system which had many desirable properties for use in such systems. U.S. Pat. No. 3,551,231 discloses the application of a hot melt adhesive blend of ethylene/vinyl ester copolymer, petroleum wax, and a thermoplastic resin, in this case in conjunction with the application of a critical degree of pressure on the tufted structure during contact with the adhesive applicator roll.

Further developments in connection with secondary carpet backings includes that in U.S. Pat. No. 3,390,035, which discloses the use of a molten thermoplastic adhesive material including an ethylene/vinyl acetate copolymer, wax, and optionally a thermoplastic resin other than the ethylene copolymer.

In U.S. Pat. No. 3,684,600 a low viscosity precoated adhesive is disclosed for application to the back side of a tufted carpet structure prior to the application of the hot melt adhesive. The back side adhesive disclosed in that patent again contains ethylene/vinyl ester copolymer, in this case along with low molecular weight, low density polyethylene, microcrystalline wax, aliphatic thermoplastic hydrocarbon resin, dicyclopentadiene alkylation polymer, antioxidant, and filler.

Similar such compositions are disclosed in U.S. Pat. Nos. 3,583,936 and 3,745,054, and improvements on these compositions are alleged to be included in U.S. Pat. No. 3,914,489 which discloses such carpet backings including ethylene/vinyl ester copolymer, a hydrocarbon resin having a prescribed softening point and viscosity, and optionally also low molecular weight ethylene homopolymer, paraffin wax, antioxidant, and filler.

U.S. Pat. No. 3,982,051 discloses yet another backsizing carpet hot melt composition, in this case including ethylene/vinyl acetate copolymer, atactic polypropylene, and vulcanized rubber.

In general, aside from these thermoplastic resin systems, the commercial systems developed for such carpet backings include the above referred-to latex system, as well as vinyl and urethane based compositions.

Furthermore, it has also been known in the past to employ various combinations of ethylene copolymer elastomers with other copolymers of ethylene for use in different environments from that of the present invention. For example, U.S. Pat. No. 3,821,333 discloses the use of a mixture of ethylene/vinyl acetate copolymer with terpolymers of ethylene, propylene and a conjugated diene (EPDM). In this particular patent, the mixture is used as a gasket for lens molds. Furthermore, U.S. Pat. No. 4,046,840 discloses blends of EPDM polymers and polyethylene for use to prepare molded products, tubing etc.; U.S. Pat. No. 4,131,564 discloses blends of EPDM polymer, ethylene/ethyl acrylate polymer and optionally polyethylene, in this patent for the preparation of tube and sheet products, wire and cable insulation and the like; and British Pat. No. 1,524,986 discloses polymer blends of EPDM with ethylene/vinyl acetate copolymer.

The search has continued, however, for improved compositions for use in the preparation of automotive carpet backing.

SUMMARY OF THE INVENTION

In accordance with the prevent invention, improved compositions of matter have now been discovered for use in the preparation of carpet backing. These compositions have high degrees of flexibility, as measured, for example, using the Tinius Olsen stiffness tester, per ASTM D747 test (Tinius Olsen stiffness testor Model 88600 or equivalent—6 inch—pound capacity, with 226 gr. total weight—samples 25×76 mm. across the width of the material—pile up—reading taken at 20°—higher numbers indicate higher stiffness).

In addition, these compositions can be utilized with increased amounts of filler material, thereby decreasing the overall cost thereof without at the same time sacrificing other highly favorable properties which they exhibit in connection with the extrusion thereof. In particular, it has now been discovered that these properties can be realized by utilizing a composition for such purposes which includes as a thermoplastic resin component a copolymer of ethylene and an unsaturated ester of a lower carboxylic acid, as an elastomer component an olefinic elastomer, and a substantial amount of a filler component.

In a preferred embodiment of the present invention the overall composition of matter will include from about 10 to about 25 weight percent of the thermoplastic resin components, from about 4 to about 15 weight percent of the olefin elastomer component, and from about 60 to about 85 weight percent, but at least about 55 weight percent of the filler component. In the past, it has not been feasible to incorporate more than about 55 weight percent of a filler component into such carpet backings without seriously affecting their ability to undergo extrusion, or without at least adversely affecting other performance properties, such as their flexibility, etc. It will generally become necessary to modify the extrusion process, such as with a concomitant need for additional extrusion aids or complex extrusion equipment, or without a severe decrease in the speed at which the extrusion and carpet production could be carried out.

In accordance with one embodiment of the present invention, the thermoplastic resin component will be a copolymer of ethylene with either (1) a vinyl ester of an aliphatic carboxylic acid, or (2) a lower alkyl ester of an unsaturated carboxylic acid.

In another embodiment of the present invention, the olefinic elastomer component will be an ethylene copolymer elastomer, and preferably a copolymer of ethylene and propylene, preferably containing from about 55 to about 70 weight percent ethylene therein. In another embodiment, however, a terpolymer of ethylene, propylene and a non-conjugated diene can be utilized as the elastomer component therein, and in yet another embodiment the olefin elastomer component can be an elastomer such as polyisobutylene, and isoprene copolymers, such as butyl rubber.

In a preferred embodiment of the present invention the thermoplastic resin components employed can include such components having a melt index of between about 1.5 and about 165, and can comprise either a single copolymer of ethylene with an unsaturated ester of a lower (such as $C_2$ to $C_4$) carboxylic acid or a mixture of such copolymers having melt indices which result in an average melt index of from about 2.5 to about 50 (for example, by employing a mixture of one such component having a melt index of between about 1.5 and 2.5 and another such component having a melt index of between about 136 and 165).

In another embodiment of the present invention, the overall composition of matter thereof will include a straight chain fatty acid and/or the salt, ester, anhydride or amides thereof, preferably a stearate or stearic acid, in amounts ranging from about 0.25 to about 2 weight percent of the total composition. Furthermore, a hydrocarbon oil, such as a napthenic or paraffinic oil, preferably in amounts ranging from about 2 to about 10 weight percent of the total composition will also preferably be included in the overall composition of matter.

In another embodiment of the present invention, a carpet construction including a plurality of carpet fibers and a thermoplastic barrier coating is provided. The thermoplastic barrier coating employed in such carpet constructions is the above-described mixture of a thermoplastic resin component, i.e., the copolymer of ethylene with an unsaturated ester of a lower carboxylic acid, the elastomer component, i.e., the olefinic elastomer, and the substantial amount of a filler component therein.

In a preferred such carpet construction the carpet fibers are preferably in the form of carpet tufts and scrim means are included for retaining the carpet tufts therein. Scrim means, preferably a woven polymer or woven jute, retains the fibers in their tufted form, and in a preferred embodiment a thermoplastic adhesive pre-coat is employed to securely bind the fibers together. The thermoplastic barrier coating can then be applied thereto. The thermoplastic adhesive pre-coat employed preferably has a melt viscosity at 375° F. of between about 4000 and 35,000 CPS.

In a preferred embodiment of the carpet construction of the present invention a textile pad is affixed to the bottom surface of the thermoplastic barrier coating, and preferably the textile pad is self-adhered thereto, i.e., no additional adhesive material is required to affix the textile pad securely thereto. However, in another embodiment another layer of thermoplastic adhesive is interposed between the thermoplastic barrier coating and the textile pad to secure the adhesive thereof.

In a preferred embodiment of the present invention the thermoplastic barrier coating can also include an amount such as up to about 20 percent by weight of trim scrap carpet such as that produced during the manufacture of the carpet construction of this invention. This material can be included in the thermoplastic barrier coating without seriously adversely affecting its overall composition or properties. It is clearly helpful to be able to do so purely in economic terms rather than to discard this trim scrap carpet material.

In a preferred embodiment of the carpet constructions of the present invention, the thermoplastic barrier coating will include from about 15 to about 25 weight percent of the thermoplastic resin component (taking into account the presence of carpet scrap including these components, if any), from about 4 to about 10 weight percent of the olefinic elastomer component, and from about 60 to about 75 weight percent of the filler component. Again, as in the case with the compositions of matter discussed above, the thermoplastic barrier coating will preferably include as the thermoplastic resin component a copolymer of ethylene with a vinyl ester of a lower aliphatic carboxylic acid, preferably where the lower alkyl ester comprises a $C_2$ alkyl ester or such a copolymer of ethylene with a lower alkyl ester of an unsaturated carboxylic acid.

Again as in the case with the compositions of matter discussed above, the thermoplastic barrier coating employed in the carpet constructions of the present invention will preferably include a stearate or stearic acid, preferably in amounts ranging from about 0.5 to about 1.5 weight percent, and also a hydrocarbon oil, preferably in amounts ranging from about 3 to about 8 weight percent.

In yet another embodiment of the present invention the method for producing a carpet construction such as that described above comprises providing a plurality of carpet fibers, preferably in the form of carpet tufts, preparing a thermoplastic barrier coating comprising a thermoplastic resin component, i.e., the copolymer of ethylene with an unsaturated ester of a lower carboxylic acid, an olefinic elastomer component, e.g., ethylene copolymer elastomer, and a substantial portion of a filler component, and applying the thermoplastic barrier coating onto the lower surface of the carpet fibers so as to securely bind the carpet fibers together and to provide a carpet backing therefore.

In a preferred embodiment of this aspect of the present invention in which carpet tufts are utilized, the method includes affixing the carpet tufts to a carpet scrim prior to applying the thermoplastic barrier coating thereto. Preferably, a thermoplastic adhesive pre-coat is also applied to the carpet fibers prior to application of the thermoplastic barrier coating thereto, the thermoplastic adhesive pre-coat preferably comprising a copolymer of ethylene with a vinyl ester of a lower aliphatic carboxylic acid, such as a lower alkyl ester.

In a preferred embodiment of this aspect of the present invention the carpet scrim is a layer of polypropylene, woven or non-woven.

In another embodiment of the method of the present invention, a textile pad is applied to the lower surface of the thermoplastic barrier coating opposite the carpet fibers or tuft, and preferably the carpet construction is molded along with the textile pad into a desired shape by the application of heat and pressure thereto.

Such molding is preferably carried out subsequent to extrusion of the thermoplastic barrier coating, by re-heating the barrier coating to a temperature above the melting point of the resin component and forming it prior to the recrystallization thereof. Preferably, this is conducted at temperatures of between about 45° and 150°C.

DETAILED DESCRIPTION

The compositions of matter of the present invention contains between about 0 and 25 weight percent, and preferably between about 15 and 25 weight percent of the thermoplastic resin component, i.e., the copolymer of ethylene with an unsaturated ester of a lower carboxylic acid. In particular, copolymers of ethylene with vinyl acetate or alkyl acrylates are employed. These ethylene copolymers will preferably have a melt index between about 1.5 and about 165, but most importantly the overall melt index of the component or components utilized will have a melt index of between about 2.5 and about 50. It has thus been found that when any of these copolymers are used which have a melt index greater than about 165, the resultant product will generally have too low a viscosity for handling in connection with extrusion during the preparation of the present carpet constructions. On the other hand, when any of such components has a melt index which is less than about 1.5, the viscosity of the overall product utilized will be much too high and extrusion or other required handling will become quite difficult. Furthermore, in such a case the degree of adhesion between the thermoplastic barrier coating hereof and any carpet padding (textile) employed by being affixed to the bottom of the carpet backing will begin to deteriorate if a separate adhesive layer is not then utilized therewith.

Where two or more different copolymers of ethylene and unsaturated esters of lower carboxylic acids are employed, the weighted average of their melt indices, on a log scale, should meet these requirements as set forth above.

The copolymers to be employed in the thermoplastic resin component of this invention will preferably contain from about 70 to about 92 weight percent ethylene, and will therefore comprise from about 8 to about 30 weight percent of the unsaturated ester of a lower carboxylic acid, i.e., the vinyl acetate or alkyl acrylate, and preferably from about 14 to about 20 weight percent thereof (i.e., from about 80 to about 86 weight percent ethylene).

It has therefore been found that when a copolymer including less than about 14 weight percent of the unsaturated ester component is employed in the copolymer the recrystallization temperature of the ethylene-unsaturated ester copolymer is raised to a point that begins to interfere with the efficient use of the present compositions in thermoforming processes. In particular, in commercial operation after extrusion of the thermoplastic barrier coating onto the carpet, the overall carpet composition is generally subjected to a molding (thermoforming) operation in which a textile pad is simultaneously applied thereof. If, however, the recrystallization temperature is too high, and the onset of recrystallization becomes close to the temperature at which the carpet construction is entering the mold after re-heating, the properties of the carpet will be seriously adversely affected. Thus, it has been found that by utilizing these preferred compositions, preferably those including greater than about 14 percent of the unsaturated ester of a lower carboxylic acid in the thermoplastic resin component, the recrystallization temperature is sufficiently lowered that these problems are avoided. One of the principal properties which therefore remains unaffected relates to the shrinkage of the product ultimately produced thereby. Thus, if the molding temperature is too close to the recrystallization temperature, or lower than the recrystallization temperature, the final product will be subject to severe shrinkage, and when employed in premolded applications such as automotive carpeting, may become unacceptable. It has also been found that when copolymers including less than about 14 weight percent of the unsaturated ester are employed, adhesion of the textile carpet padding may be adversely affected.

It should also finally be noted, however, that it is possible to utilize in the thermoplastic resin component hereof, unsaturated esters of lower carboxylic acids, such as vinyl acetate, which have less than about 14 percent of that component in the copolymer, i.e., between about 3 and 14 weight percent thereof, but that in such a case it may become necessary to employ special techniques of temperature control and mold design to control or compensate for shrinkage. It may also be necessary to employ a tackifying resin in combination therewith to obtain adequate adhesion to the textile carpet padding. These tackifying resin materials are discussed in more detail below.

Examples of alkyl acrylates which may be employed in connection with this invention include methyl acrylate, ethyl acrylate, propyl acrylate and butyl acrylate. The most preferred alkyl acrylate to be employed is ethyl acrylate.

There are a number of copolymers of ethylene with vinyl acetate and/or alkyl acrylates which can be employed in connection with this invention and which are presently commercially available. These include Ultrathene UE 621, which is a copolymer of 81 percent ethylene and 19 percent vinyl acetate with a melt index of about 2.5, and Elvax 420 or Ultrathene UE 612, both of which are copolymers of about 82 percent ethylene and 18 percent vinyl acetate with a melt index of about 150.

It is essential that the thermoplastic barrier coating composition of the present invention include an olefinic elastomer component, such as an ethylene copolymer elastomer, and that the olefinic elastomer component preferably be present in amounts ranging from about 4 to about 15 weight percent, most preferably between about 5 and about 10 weight percent of the total composition.

The olefinic elastomer component hereof can comprise ethylene copolymer elastomers, such as copolymers of ethylene with higher alpha-olefins such as propylene, or other olefinic elastomers such as polyisobutylene and isoprene copolymer elastomers, such as butyl rubber, a vulcanizable rubbery copolymer containing from about 85 to 99.5 percent combined isoolefin having from 4 to 8 carbon atoms and 0.5 to 15 percent combined conjugated diolefin having from 4 to 8 carbon atoms. Such copolymers and their preparation are well known, and generally the isoolefin is a compound such as isobutylene and the diolefin is a compound such as butadiene or isoprene. The preferred olefinic elastomer components hereof, however, will comprise the ethylene elastomer copolymers.

The ethylene elastomer copolymers for use herein should include between about 55 and about 70 weight percent ethylene, preferably between about 60 and about 70 weight percent ethylene. It has thus been found that if the ethylene level therein is too low, i.e., below these levels, insufficient crystallinity for the strength of the product is provided. That is, the product may tend to become amorphous, and become increasingly tacky, tend to stick together, etc. On the other hand, if the ethylene level is too high, i.e., above these levels, if a hydrocarbon oil is present in these compositions (as is preferred) some of that oil would be rejected therefrom. Furthermore, some of the flexibility and other physical properties of the product will begin to be adversely affected. The olefinic elastomers for use herein should have a molecular weight providing a Mooney viscosity (ML1+8 at 260° F.) between about 25 and 80, but at least greater than about 25. At lower viscosities, these elastomers will not impart sufficient melt strength and other physical properties to be useful as carpet backing, particularly in connection with application by extrusion. On the other hand, if the viscosity is greater than these levels, handling these materials will be extremely difficult, again particularly where extrusion of this material is desired. It should be noted, however, that in some cases an oil extended elastomer might be employed in connection with the compositions of this invention. In such case the above Mooney viscosity figures would apply to the overall oil extended elastomer, since removal of the oil therefrom would result in the presence of Mooney viscosities considerably higher than those set forth above, but that the presence of the oil therein, resulting in Mooney viscosities within the ranges set forth above, renders these materials entirely acceptable in the compositions of this invention.

It is also within the scope of this invention to employ as the olefinic elastomer an ethylene copolymer elastomer comprising a terpolymer of ethylene, propylene and a non-conjugated diene (EPDM is the ASTM description therefore). In such compounds, the ethylene and propylene form a fully saturated backbone of methylene linkages with unsaturated side chains, with the non-conjugated diolefin (usually dicyclopentadiene, 1-4 hexadiene, methylene norbornene, or ethylene norbornene) attached to provide readily available crosslinking sites for sulphur curing. The non-conjugated dienes may be straight chain or cyclic hydrocarbon diolefins having from 6 to 15 carbon atoms, such as dicyclopentadiene, tetrahydroindine, 5-methylene-2-norbornene, 1-4-hexadiene, 5-ethylidene norbornene, 4-7-8-9-tetrahydroindine, etc.

In the thermoplastic carpet backing materials employed in the past, it has been possible to incorporate therein up to about 55 weight percent of a filler material, such as calcium carbonate. The use of this material not only reduces the overall cost of the carpet backing, but helps provide for its acoustical barrier properties, etc. In accordance with the present invention, it is possible to employ greater amounts of filler material in the overall composition while achieving even superior physical properties therein. Thus, filler in amounts of greater than about 55 weight percent, and preferably between about 60 and 85 weight percent can now be employed. These fillers are in the form of a finely divided material which will not melt or decompose at the temperature of the molten material, such as during extrusion. The preferred filler materials to be employed include inorganic materials such as calcium carbonate, barium sulphate, talc, clay, etc., with calcium carbonate being highly preferred. The finely divided filler component will generally have a uniform particle size such that more than about 85% thereof will pass through a 325 mesh screen. It has been found, however, that when these particles get too small, e.g., less than about 5μ, there appears to be greater build up of heat during extrusion therewith, and that these processes can be adversely affected.

Another ingredient which will preferably be included in the compositions of the present invention comprises certain straight chain fatty acids or the salts, esters, anhydrides, or amides thereof, preferably stearic acid and/or stearates, i.e., the salts or esters of stearic acid. The amount of this component employed in these compositions has been found to be of quite critical significance. Amounts between about 0.25 and 2 weight percent should be employed. It has thus been found that the presence of this component is quite helpful in the processing of the thermoplastic barrier coatings used in the preparation of the present carpet constructions. It has also been found that if amounts of less than about 0.25 weight percent are employed, no such effects can be realized, but if amounts greater than about 2 weight percent are employed, these materials tend to come to the surface as a powder and interfere with the handling and utilization of the final products.

Examples of these fatty acid esters include the oleates and stearates, with the stearates (and stearic acid) being particularly preferred. Specific preferred stearates which could be employed in connection with the present invention include zinc and calcium stearate.

A hydrocarbon oil, such as an apthenic or preferably a paraffinic oil, can also be included in the present compositions, and the presence of such oils assists in the processing or extrusion thereof, primarily be reducing the viscosity of the blend. It is therefore important that the particular oil utilized therein have a low volatile component content at the temperatures at which it is intended to process this material, and furthermore that the oil be compatible with the resins and elastomers required in this blend. There are a number of such oils which are commercially available. These include Sunpar 2280, Flexon 815, and Flexon 580, Sunpar and Flexon being trademarks for a series of petroleum oils marketed by Sun Oil Company and Exxon Company, USA, respectively.

It is also possible, as discussed above, to include a tackifying resin in certain embodiments of the present invention. The use of these materials, as discussed above in connection with the lower levels of unsaturated ester, is primarily intended to assist in the adhesion of the carpet backing material to a fibrous pad or underlay which is usually affixed to the bottom thereof. It has been found, however, that when employing the preferred compositions of the present invention, the presence of such a tackifying resin is not essential. Thermoplastic resins of the types commonly used in hot melt adhesives or in rubber compounding may be employed. Such resins include, but are not necessarily limited to, petroleum derived aliphatic hydrocarbon resins such as ESCOREZ 1102 and ESCOREZ 1304, both products of Exxon Chemical Co., Piccopale 100, a product of the Picco Resins Co., coumarone-indene resins such as CUMAR MH-2, a product of Allied Chemical Co., and thermoplastic phenolic resins such as DUREZ 29095, a product of Hooker Chemical Co.

It is also possible to include a surface treatment additive for the purpose of hydrophobic wetting, coupling and dispersing the filler material thereby improving flexibility, processing and filler loading capacity. Examples of such additives are titanates, polymeric esters, and organic salts of carboxylic acids. There are a number of such products commercially available. These include Kenreact TTS, a product of Kenrich Petrochemicals, Inc., and BYK W-900, a product of Byk-Mallinckrodt Chemische Produkte GmbH, Ltd.

As discussed above, in a preferred embodiment of this invention a thermoplastic adhesive pre-coat is applied to the fibers prior to application of the thermoplastic barrier coating hereof. The thermoplastic adhesive selected for this pre-coat must have sufficient adhesion when cooled so as to bond the carpet fibers comprising the carpet pile together and to the carpet backing. This adhesive pre-coat must therefore have a softening point above the maximum temperature which is expected to be encountered during actual use and at its melt point it must wet out the carpet fibers and have a sufficiently low viscosity so as to penetrate the mass of fibers forming the back of the carpet. It has thus been found that the use of such thermoplastic adhesive pre-coats which have softening points of at least about 200° F. or higher and melt viscosities at 375° F. of about 4000 to 35,000 CPS are thus suited herefor. In particular, the preferred thermoplastic adhesive pre-coats comprise copolymers of ethylene and vinyl acetate. Examples of commercially available thermoplastic adhesive pre-coat materials which can be so utilized are compounds such as Elvax 420 sold by DuPont. Elvax 420 is a copolymer comprising 17.5 to 18.5 percent vinyl acetate with the remainder being essentially polyethylene. Elvax 420 has a softening point of about 210° F. and a melt index of about 136 to 165 (melt index gm/10 min. at 190° C. ASTM D1238). In addition, another such compound which is commercially available is Ultrathene UE 612, a product of U.S.I. Chemicals, which similarly is a copolymer of vinyl acetate and ethylene, in this case comprising about 19% vinyl acetate.

It is also within the scope of this invention to include yet another coating between the thermoplastic barrier layer and a textile pad or the like affixed to the bottom thereof. This third adhesive coating layer is a melt adhesive and is applied in a relatively thin coating of about 1 to 4 ounces per square yard. In this case it is preferable to employ an ethylene-type polymer or copolymer adhesive and to coextrude it on to the back along with the thermoplastic barrier layer in a conventional manner.

When the thermoplastic barrier coatings of the present invention are to be employed for the preparation of a tufted carpet backing, such as a tufted automotive carpet backing, the overall carpet production scheme would be as follows. The carpet fibers generally comprising a synthetic yarn such as nylon polyester or polypropylene, are tufted utilizing a retainer or scrim, which can be any type known in the art, including woven materials such as jute, polypropylene, etc., or can be a non-woven fabric, e.g., needle punched, non-woven polypropylene web, etc. The carpet can then be dyed to the desired color, and the dyed carpet, affixed to the carpet scrim, is then ready for coating with the thermoplastic adhesive pre-coat and then the thermoplastic barrier coatings of the present invention onto the underside of this primary scrim. The thermoplastic adhesive pre-coat is extruded onto the backside of the carpet. The thermoplastic barrier coatings of the present invention can then be prepared by a number of conventional means by which two or more ingredients are brought into intimate contact with each other. For example, the thermoplastic resin material, the elastomer material, the fatty acid, the oil and the filler component can all be intimately blended together in a ribbon blender and then fed into a high shear continuous mixer. On the other hand, these ingredients can be mixed together in a Banbury or a similar internal mixer. The thermoplastic resin material, the elastomer material, the filler, and the oil can be mixed while heating to a temperature of between about 150° and 225° C., under conditions of high shear until a uniform melt is prepared. At this point the stearic acid or stearate component can be added, since if this component is added at too early a stage, it may cause problems in the mixture of the other components.

As mentioned above, the thermoplastic barrier coatings of the present invention can also include pieces of carpet trim scrap, that is, scrap produced during the trimming of the carpet itself during its manufacture. This material can be added to the mix prior to melting, generally in a cubed form produced by a standard chopper, in amounts of up to about 20 percent by weight, and in that case readily blends with the virgin materials upon melting. The fibers in the trim scrap do not have to be removed as they are dispersed throughout the thermoplastic barrier coatings as individual fibers which merely add additional reinforcement thereto. In addition, adding this trim scrap material also imparts color to the backing itself which generally is somewhat neutral in color. Furthermore, use of this trim scrap material reduces the cost of the product by enabling one to use the scrap produced therein rather than discarding same. Addition of the trim scrap material further adds strength to the thermoplastic barrier coating since the fibers themselves tend to reinforce same, and they further appear to prevent shrinkage thereof.

The thermoplastic barrier coatings of the present invention can be applied to the particular substrate such as the carpet discussed above by a number of well known methods for applying coatings of molten adhesives and the like. For example, and most preferably, these thermoplastic barrier coatings can be applied by extrusion, but other methods such as the use of a calendar to spread the material onto the back of the carpet could in some cases be utilized.

The thermoplastic barrier coating composition of this invention are applied to the carpet in amounts ranging from about 25 to about 150 ounces per square yard of carpet, and at temperatures of between about 300° and 400° F. It is possible, and indeed preferred in some applications such as automotive carpet backing, to apply the carpet backing composition hereof at different thicknesses at different portions of the carpet itself. Thus, the thickness of the carpet backing can range from between 0.015 and 0.025 inches at some locations to between 0.115 and 0.125 inches at others. It is also understood that the temperature must be maintained so that melting or decomposition of the textile backing and fibers does not occur, and yet be substantially above the melting point of the barrier coating composition. Following extrusion or other application of these compositions, the product is then cooled and processed further. Items such as vinyl heel pads used on automotive carpeting can then be applied an this generally includes cutting the carpet into blanks. The product can then be subjected to a molding operation in which the carpet is shaped and the padding discussed above is applied to the underside thereof. The padding is applied during this operation so that it becomes affixed to the bottommost layer of carpet backing has not yet hardened and which is subjected to heat and pressure during the molding step. These pads generally comprise various types of waste fabric materials, including jute, cotton, polyester, etc. The final molded carpet is then trimmed, cooled, and ready for use. The molding operation is generally conducted at temperatures of between about 250° and 300° F.

The scope and significance of the present invention may be more fully understood with reference to the following specific examples thereof.

EXAMPLE 1

In order to demonstrate the improved flexibility of the carpet backing compositions of the invention, one such composition was compared with a comparable prior art composition which did not include the elastomeric component hereof. In particular, and referring to Table I hereof, a first composition, Composition A, including 55 percent filler and 45 percent ELVAX 460 (a previously employed commercial automotive carpet backing composition) was compared to a second composition, Composition B, including 10 percent VISTALON 3708, 70 percent filler, 10 percent LD401, 2 percent Stearic acid, and 8 percent SUNPAR 2280, of the present invention. In particular, the comparison was made using the Tinius Olsen stiffness tester as described on page 6 of this application, and the results shown in Table I demonstrate the improved flexibility of the as-extruded materials of the present invention.

Furthermore, additional such results are shown in Table II hereof, for the same compositions (A and B), but in this case tested when used in completed carpet compositions of varying carpet backing weights. These results demonstrate the improved flexibility of each comparable composition employing the compositions of the invention, over the range of commercially used carpet backing weights.

TABLE I

| Comparable Stiffness of Carpet Backing Compositions | | |
|---|---|---|
| (Weight percentages) | Composition A | Composition B |
| VISTALON 3708 | — | 10 |
| Georgia Marble D-90 Filler | 55 | 70 |
| ELVAX 460 | 45 | — |
| LD 401 | — | 10 |
| Stearic Acid | — | 2 |
| SUNPAR 2280 | — | 8 |
| RESULTS | | |
| Stiffness - Tinius OLSEN Stiffness testor, ASTM D 747, 0.60 lb. per square ft., extruded sheet (backing without carpet), higher values indicate greater stiffness | 40 | 10 |

TABLE II

| Comparable Stiffness of Carpet Compositions | | |
|---|---|---|
| | Carpet including as backing | |
| | Composition A | Composition B |
| | RESULTS | |
| | (Stiffness - Tinius Olsen | |
| Density (lbs./ft²) | stiffness testor ASTM D747) | |
| .30 | 23 | — |
| .31 | — | 4 |
| .53 | 54 | — |
| .56 | 57 | 18 |
| .60 | 71 | — |
| .68 | 80 | — |
| .71 | — | 24 |
| .82 | — | 28 |

EXAMPLE 2

A number of carpet compositions were prepared employing thermoplastic barrier coating compositions within the scope of the present invention. In Runs 1, 2, 3 and 4 in Table III, different ethylene copolymer elastomers were employed. In Runs 1 and 4, 10% and 6% by weight, respectively, of VISTALON 3708, a copolymer of ethylene and propylene including about 64 weight percent ethylene was utilized. In Run 2 a copolymer of ethylene and propylene elastomer including a higher ethylene content was employed, and in Run 3 another copolymer of ethylene and propylene elastomer having a higher ethylene content but a lower molecular weight was employed. Furthermore, in Runs 1, 2 and 4, a combination of two thermoplastic resin components was employed, namely mixtures of a copolymer of ethylene with 9% vinyl acetate copolymer (LD-401, a product of Exxon Chemical Company) and a copolymer of ethylene with 18% vinyl acetate (Elvax 420, a product of DuPont) in Runs 1 and 2, and a combination of the ELVAX 420 with a copolymer of ethylene with 17½–18½% vinyl acetate (ELVAX 460) in Run 4. In Run 3, however, only a single thermoplastic resin component was employed, namely the initially mentioned copolymer with 9% vinyl acetate therein. In each of the cases 70 weight percent of calcium carbonate was included therein, and the other ingredients are listed in Table III.

The results shown therein indicate that in each case the compositions produced had acceptable physical characteristics and could be extruded using conventional sheet extrusion equipment, but that the quality of these backing materials is strongly influenced by the higher vinyl acetate content EVA copolymer, and demonstrates less shrinkage after thermoforming.

EXAMPLE 3

In another series of runs further compositions in accordance with the present invention were prepared, and these are set forth in Table IV annexed hereto. In these runs, Runs 5 through 11, the results demonstrate improved pad adhesion employing these compositions.

TABLE III
EFFECT OF ELASTOMER TYPE ON PROCESSING AND PROPERTIES

|  | RUN 1 | RUN 2 | RUN 3 | RUN 4 |
|---|---|---|---|---|
| VISTALON 3708, wt. % | 10 | — | — | 6 |
| MD-719, wt. % | — | 10 | — | — |
| MD-702, wt. % | — | — | 10 | — |
| Calcium Carbonate, wt. % | 70 | 70 | 70 | 67 |
| LD-401, wt. % | 5 | 5 | 10 | — |
| Stearic Acid, wt. % | 0.5 | 0.5 | 0.5 | 1 |
| Oil (Sunpar 2280), wt. % | 9.5 | 9.5 | 9.5 | 4 |
| Elvax 420, wt. % | 5 | 5 | — | 3.5 |
| Elvax 460, wt. % | — | — | — | 18.5 |
| Processing | | | | |
| Melt Index at 190° C., gm/10 min. | 2.7 | 2.9 | 3.8 | 2.2 |
| Instrumented Lab Extruder | | | | |
| Temperature build-up in barrel-deviation from set point | +14° C. | +8° C. | +9° C. | — |
| Adapter: Temp. Deviation | +13° C. | +13°C. | +11° C. | — |
| Pressure, psi | 1,570 | 1,450 | 1,270 | — |
| Output/torque (gm/min) : N m | 2.6 | 3.0 | 2.9 | 2.4 |
| Notes | — | — | sags coming out of extruder | 2.4 |
| Quality of Extrudate | | | | |
| Surface | smooth | smooth | slightly rough | smooth |
| Physical Properties | satisfactory | stiffer, low elongation, extruded sheet breaks rather than draws when stretched | weak, "cheesy" | satisfactory |

TABLE IV
FORMULATIONS OF EXPERIMENTAL COMPOUNDS FOR IMPROVED PAD ADHESION

|  | RUN 5 | RUN 6 | RUN 7 | RUN 8 | RUN 9 | RUN 10 | RUN 11 |
|---|---|---|---|---|---|---|---|
| VISTALON 3708 | 10 | 9 | 9 | 9 | 9 | 9 | 9 |
| Georgia Marble D-90 | 70 | 70 | 70 | 70 | 70 | 70 | 70 |
| LD-401 | 6.7 | 6.7 | 6.7 | 6.7 | 6.7 | 6.7 | 6.7 |
| Stearic Acid* | 1 | 1 | 1 | 1 | 1 | 1 | 1 |
| Sunpar 2280 Oil | 9 | 8 | 8 | 8 | 8 | 8 | 8 |
| Elvax 420 | 3.3 | 3.3 | 3.3 | 3.3 | 3.3 | 3.3 | 3.3 |
| Escorez 1304* | — | 2 | — | — | — | — | — |
| Cumar MH-2* | — | — | 2 | — | — | — | — |
| Escorez 1102* | — | — | — | 2 | — | — | — |
| PA-50-009 Resin | — | — | — | — | 2 | — | — |
| PA-99 Resin | — | — | — | — | — | 2 | — |
| Durez 29095 | — | — | — | — | — | — | 2 |
| Mixing: No. 1D Banbury 4½ minutes DUMP TEMP (°F.) | 360 | 365 | 375 | 375 | 370 | 380 | 400 |
| Melt Index | | | | | | | |
| at 190° C., g/10 min | 2.52 | 3.52 | 3.55 | 3.70 | 4.23 | 4.71 | 4.88 |
| Adhesion to Textile Fiber Pad (measured using extruded sheet) | fair–good+ | fair–good+ | good | good | good | good | good |
| (measured using compression molded plaques) | fair good | fair–good | good | fair– | good | good | good |

*Add after fluxing.

choice of elastomer. In this instance, the best properties were obtained using the elastomer selected from Runs 1 and 4. The composition of Run 4 includes, however, a

What is claimed is:
1. A composition of matter useful in the preparation of a thermoplastic acoustical and thermal barrier for carpet backing having improved flexibility as measured with the Tinius Olsen stiffness test, such composition being extrudable and comprising from 10 up to about 25 weight percent of a thermoplastic resin component comprising a copolymer of ethylene and an unsaturated ester of a lower carboxylic acid, from about 4 to about 15 weight percent of an olefinic elastomer component, and from about 60 to about 85 weight percent of a filler component.

2. The composition of matter of claim 1 wherein said olefinic elastomer component comprises an ethylene copolymer elastomer.

3. The composition of matter of claim 2, wherein said olefinic elastomer component comprises a copolymer of ethylene and propylene.

4. The composition of matter of claim 2, wherein said olefinic elastomer component comprises a terpolymer of ethylene, propylene and a non-conjugated diene.

5. The composition of matter of claim 1 wherein said olefinic elastomer component is selected from the group consisting of polyisobutylene, and isoprene copolymer elastomers.

6. The composition of matter of claim 1, including from about 4 to about 10 weight percent of said olefinic elastomer component, from about 15 to about 25 weight percent of said thermoplastic resin component, and from about 60 to about 75 weight percent of said filler component.

7. The composition of matter of claim 1, wherein said filler component comprises an inorganic filler selected from the group consisting of barium sulphate, and calcium carbonate.

8. The composition of matter of claim 1, wherein said unsaturated ester of a lower carboxylic acid is selected from the group consisting of vinyl esters and alkyl acrylates.

9. The composition of matter of claim 8, wherein said vinyl ester comprises vinyl acetate.

10. The composition of matter of claim 1, wherein said thermoplastic resin component comprises a copolymer of ethylene and vinyl acetate including from about 8 to about 30 weight percent of said vinyl acetate.

11. The composition of matter of claim 1, wherein said thermoplastic resin component has a melt index of between about 2.5 and about 50.

12. The composition of matter of claim 11, wherein said thermoplastic resin component comprises a mixture of copolymers of ethylene and unsaturated esters of lower carboxylic acids.

13. The composition of matter of claim 12, wherein said mixture of copolymers comprises a first copolymer having a melt index of between about 1.5 and about 2.5 and a second copolymer having a melt index of between about 150 and about 160.

14. The composition of matter of claim 1, including an additive selected from the group consisting of stearic acid and stearates.

15. The composition of matter of claim 14, including from about 0.25 to about 20 weight percent of said additive.

16. The composition of matter of claim 1, including a hydrocarbon oil.

17. The composition of matter of claim 16 wherein said hydrocarbon oil component is selected from the group consisting of paraffinic and naphthenic oils.

18. The composition of matter of claim 16 comprising between about 2 and about 10 weight percent of said hydrocarbon oil component.

19. A composition of matter useful in the preparation of a thermoplastic acoustical and thermal barrier for carpet backing having improved flexibility as measured with the Tinius Olsen stiffness test, such composition being extrudable and comprising from about 4 to about 15 weight percent of an olefinic elastomer component, from about 60 to about 85 weight percent of a filler component, and a thermoplastic resin component comprising a copolymer of ethylene and an unsaturated ester of a lower carboxylic acid.

20. The composition of matter of claim 19 wherein said olefinic elastomer component comprises an ethylene copolymer elastomer.

21. The composition of matter of claim 20, wherein said olefinic elastomer component comprises a copolymer of ethylene and propylene.

22. The composition of matter of claim 19, wherein said filler component comprises an inorganic filler selected from the group consisting of barium sulphate, and calcium carbonate.

23. The composition of matter of claim 19, including an additive selected from the group consisting of stearic acid and stearates.

24. The composition of matter of claim 19, including a hydrocarbon oil.

25. The composition of matter of claim 24 wherein said hydrocarbon oil component is selected from the group consisting of paraffinic and naphthenic oils.

26. The composition of matter of claim 24 comprising between about 2 and about 10 weight percent of said hydrocarbon oil component.

27. A thermoplastic composition useful as a backing material for carpeting, said thermoplastic composition consisting of by weight:
  (a) About 10–25 percent of an ethylene containing polymer which is an ethylene/monounsaturated ester copolymer having a melt index of about 2.5 to 50
  (b) About 4–15 percent of a non-vulcanized elastomer having a Mooney viscosity of about 25–80, which is a polyisobutylene, butyl rubber, a copolymer of ethylene and propylene or a terpolymer of ethylene, propylene and a minor amount of a diene monomer or mixtures thereof, and the diene is selected from the class consisting of 1,4-hexadiene, dicyclopenatdiene, methylenenorbornene, ethylenenorbornene, tetrahydroindene, 5-methylene-2-norbornene, 5-ethylidene norbornene, and 4-7-8-9-tetrahydroindene,
  (c) About 60–85 percent of an inert mineral filler, and
  (d) About 1–15 percent of a plasticizer for the ethylene containing polymer comprising a hydrocarbon oil.

28. A composition as claimed in claim 27 wherein said filler is calcium carbonate or barium sulfate.

29. A composition as claimed in claim 27 wherein said ethylene containing polymer is an ethylene/mono-unsaturated ester copolymer.

30. A composition as claimed in claim 29 in which the ethylene/mono-unsaturated ester copolymer is selected from the group consisting of vinyl esters and alkyl acrylates.

31. A composition as claimed in claim 30 wherein said ethylene/mono-unsaturated ester copolymer contains 70–92 percent ethylene and 30–8 percent of a comonomer selected from the group consisting of alkyl acrylate and vinyl acetate.

32. The composition as claimed in claim 27 wherein said plasticizer is a hydrocarbon oil.

33. A carpet construction comprising a plurality of carpet fibers, and an extrudable thermoplastic acoustical and thermal barrier comprising from 10 up to about 25 weight percent of a thermoplastic resin component comprising a copolymer of ethylene and an unsaturated ester of a lower carboxylic acid, from about 4 to about 15 weight percent of an olefinic elastomer component, and from about 60 to about 85 weight percent of a filler component.

34. The carpet construction of claim 33 wherein said plurality of fibers are in the form of carpet tufts, and including scrim means for retaining said carpet tufts.

35. The carpet construction of claim 33 including a thermoplastic adhesive pre-coat to securely bind said fibers.

36. The carpet construction of claim 35 wherein said thermoplastic adhesive pre-coat has a melt viscosity at 375° F. of about 4,000 to about 35,000 CPS.

37. The carpet construction of claim 36 wherein said thermoplastic adhesive pre-coat comprises a copolymer of ethylene with a vinyl ester of a lower aliphatic carboxylic acid.

38. The carpet construction of claim 33, including a textile pad affixed to said thermoplastic barrier coating.

39. The carpet construction of claim 33, wherein said thermoplastic resin component comprises a copolymer of ethylene and vinyl acetate.

40. The carpet construction of claim 39, wherein said copolymer of ethylene and vinyl acetate comprises between about 8 and about 30 weight percent of said vinyl acetate.

41. The carpet construction of claim 33 comprising between about 15 and about 25 weight percent of said thermoplastic resin component, from about 4 to about 10 weight percent of said olefinic elastomer component, and from about 60 to about 75 weight percent of said filler component.

42. The carpet construction of claim 33, wherein said olefinic elastomer component comprises an ethylene copolymer elastomer.

43. The carpet construction of claim 42 wherein said ethylene copolymer elastomer comprises a copolymer of ethylene and propylene.

44. The carpet construction of claim 33 wherein said copolymer of ethylene and propylene comprises between about 55 and about 70 weight percent ethylene.

45. The carpet construction of claim 33 wherein said thermoplastic barrier coating includes up to about 20 weight percent of scrim scrap carpet composition therein.

46. The carpet construction of claim 33, wherein said thermoplastic barrier coating includes between about 0.25 and about 2.0 weight percent of an additive selected from the group consisting of stearic acid and stearates.

47. The carpet construction of claim 33, wherein said thermoplastic barrier coating includes between about 2 and about 10 weight percent of a hydrocarbon oil component.

48. A tufted automotive carpet comprising a base fabric stitched with erect loops of yarn to form tufts on the top side of the base fabric and a thermoplastic backing composition on the bottom side of said base fabric, said composition comprising by weight:

(a) About 10-25 percent of an ethylene containing polymer comprising an ethylene/mono-unsaturated ester copolymer,
(b) About 4-15 percent of a non-vulcanized elastomeric resin,
(c) About 60-85 percent of an inert mineral filler, and
(d) About 2-10 percent of a plasticizer.

49. A tufted automotive carpet comprising a base fabric stitched with erect loops of yarn to form tufts on the top side of the base fabric and a thermoplastic backing composition on the bottom side of said base fabric, said composition comprising by weight:

(a) About 10-25 percent of an ethylene containing polymer comprising an ethylene/mono-unsaturated ester copolymer,
(b) About 4-10 percent of a non-vulcanized elastomeric resin,
(c) About 60-85 percent of an inert mineral filler, and
(d) About 2-10 percent of a plasticizer.

50. A tufted automotive carpet as claimed in claims 48 or 49 wherein said non-vulcanized elastomeric resin is a copolymer of ethylene and propylene or a terpolymer of ethylene, propylene and a minor amount of diene or other termonomer, said mono-saturated ester being selected from the group consisting of vinyl esters and alkyl acrylates.

51. A tufted automotive carpet as claimed in claims 48 or 49 wherein there is a layer of precoat composition between said thermoplastic backing composition and said base fabric, the precoat composition having a lower viscosity than said backing composition and containing a copolymer of ethylene and a vinyl ester of a lower aliphatic carboxylic acid.

52. A method for producing a carpet construction comprising providing a plurality of carpet fibers, preparing a thermoplastic barrier comprising from 10 up to about 25 weight percent of a thermoplastic resin component comprising a copolymer of ethylene and an unsaturated ester of a lower carboxylic acid, from about 4 to about 15 weight percent of an olefinic elastomer component, and from about 60 to about 85 weight percent of a filler component, and extruding said thermoplastic barrier for application onto said carpet fibers so as to securely bind said carpet fibers together and to provide an acoustical and thermal barrier therefore.

53. The method of claim 52 including providing said carpet fibers in the form of carpet tufts, and affixing said carpet tufts to a carpet scrim prior to applying said thermoplastic barrier coating thereto.

54. The method of claim 53 including applying a thermoplastic adhesive pre-coat to said carpet fibers prior to applying said thermoplastic barrier coating thereto.

55. The method of claim 53 wherein said thermoplastic adhesive pre-coat comprises a copolymer of ethylene with a vinyl ester of a lower aliphatic carboxylic acid.

56. The method of claim 52 including applying a textile pad to the surface of said thermoplastic barrier coating opposite from said carpet fibers.

57. The method of claim 56 including molding said carpet construction including said textile pad into a desired shape by the application of heat and pressure thereto.

58. The method of claim 57 wherein said molding is carried out at a temperature of between about 45° and 150° C.

59. The method of claim 52 wherein said thermoplastic barrier includes a hydrocarbon oil.

60. The method of claim 59 wherein said hydrocarbon oil is selected from the group consisting of paraffinic and naphthenic oils.

61. The method of claim 59 wherein said hydrocarbon oil is present in an amount of from about 2 to about 10 weight percent.

62. In a process for preparing a molded automotive carpet comprising forming a tufted structure of a base fabric stitched with closely spaced tufts of yarn, applying a thermoplastic composition to the bottom side of the tufted structure and molding the resulting product to the desired contour, the improvement of using a thermoplastic composition comprising by weight:
 (a) About 10–25 percent of an ethylene containing polymer comprising an ethylene/mono-unsaturated ester copolymer,
 (b) About 4–15 percent of a non-vulcanized elastomeric resin,
 (c) About 60–85 percent of an inert mineral filler, and
 (d) About 2–10 percent of a plasticizer.

63. In a process for preparing a molded automotive carpet comprising forming a tufted structure of a base fabric stitched with closely spaced tufts of yarn, applying a thermoplastic composition to the bottom side of the tufted structure and molding the resulting product to the desired contour, the improvement of using a thermoplastic composition comprising by weight:
 (a) About 10–25 percent of an ethylene containing polymer comprising an ethylene/mono-unsaturated ester copolymer,
 (b) About 4–10 percent of a non-vulcanized elastomeric resin,
 (c) About 60–85 percent of an inert mineral filler, and
 (d) About 2–10 percent of a plasticizer.

* * * * *

UNITED STATES PATENT AND TRADEMARK OFFICE
CERTIFICATE OF CORRECTION

PATENT NO. : 4,508,771

DATED : June 25, 1985

INVENTOR(S) : Peoples, Jr. et al

It is certified that error appears in the above-identified patent and that said Letters Patent is hereby corrected as shown below:

Column 3, line 6, "prevent" should read --present--.

Column 3, lines 60-61, "copolymers" should read --copolymer--.

Column 3, lines 60-61, after "copolymer" insert --elastomers--.

Column 5, line 54, "O" should read --10--.

Column 9, line 9, "be" should read --by--.

Column 14, Table IV, "6.7" which appears between columns RUN 10 and RUN 11 for LD-401 should be moved into alignment under column "RUN 11".

Column 14, Table IV, "good" appearing at the bottom of column "RUN 5" should be moved to the bottom of column "RUN 6".

Column 14, TABLE IV, "good" appearing at the bottom of column "RUN 7" should be moved to the bottom of column "RUN 8".

Column 15, line 59, "20" should read --2.0--.

Column 16, line 39, after "50" insert --,--.

Column 17, line 47, "33" should read --43--.

Signed and Sealed this

Fifteenth Day of October 1985

[SEAL]

Attest:

DONALD J. QUIGG

Attesting Officer

Commissioner of Patents and
Trademarks—Designate